United States Patent [19]

Simson et al.

[11] 4,121,274
[45] Oct. 17, 1978

[54] SELF-HEALING ELECTRICAL CAPACITOR AND METHOD FOR ITS PRODUCTION

[75] Inventors: Reiner Simson, Heidenheim; Karl-Heinz Schindhelm, Herbrechtingen; Werner Vogel, Heidenheim, all of Germany

[73] Assignee: Siemens Aktiengesellschaft, Berlin and Munich, Germany

[21] Appl. No.: 788,313

[22] Filed: Apr. 18, 1977

[30] Foreign Application Priority Data

Apr. 30, 1976 [DE] Fed. Rep. of Germany ....... 2619260

[51] Int. Cl.² .............................................. H01G 4/24
[52] U.S. Cl. .................................. 361/273; 29/25.42; 361/304; 361/314; 361/323; 427/79
[58] Field of Search ............... 29/25.42; 361/314, 323, 361/273, 304; 427/79

[56] References Cited

U.S. PATENT DOCUMENTS 3,614,561  10/1971  Behn ................................. 361/323

FOREIGN PATENT DOCUMENTS 975,276    7/1949  Fed. Rep. of Germany ........... 361/323
1,191,299 12/1967  United Kingdom ..................... 361/314
1,183,155  3/1970  United Kingdom ..................... 361/314

Primary Examiner—E. A. Goldberg
Attorney, Agent, or Firm—Hill, Gross, Simpson, Van Santen, Steadman, Chiara & Simpson

[57] ABSTRACT

A self-healing electrical coil capacitor, in particular for AC applications, comprising dielectric films of polypropylene. Metal coatings are provided on the films and exposed margins are left at the longitudinal sides of the films. The films are swelled in the region of the exposed margins. As a result, the previously observed decrease in capacity which occurred during the operation of such AC capacitors can be eliminated to a large extent.

6 Claims, 3 Drawing Figures

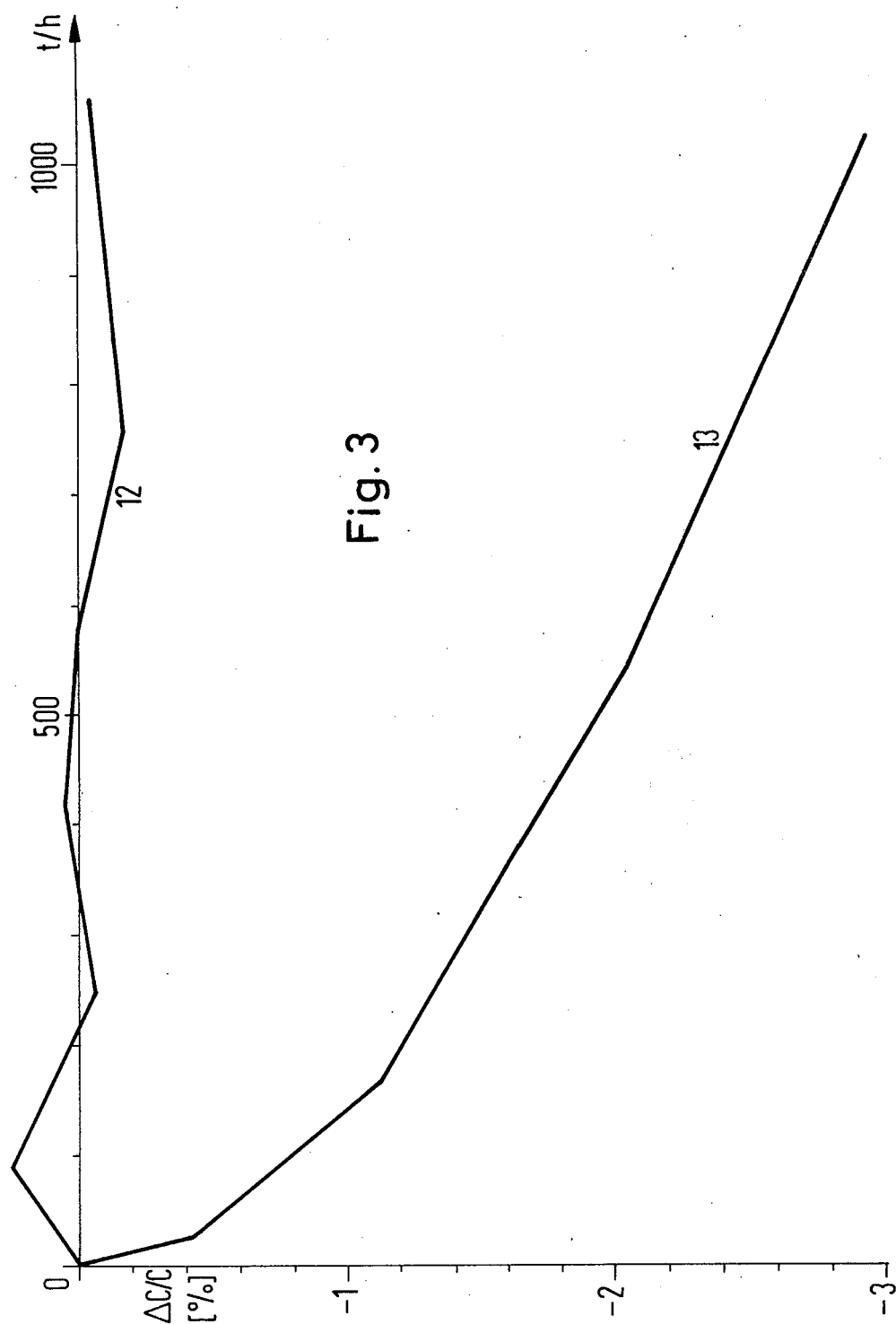

SELF-HEALING ELECTRICAL CAPACITOR AND METHOD FOR ITS PRODUCTION

BACKGROUND OF THE INVENTION

The invention relates to a self-healing electrical capacitor, in particular for AC, consisting of coiled layers of polypropylene films with metallizations, whereby the metallizations are applied onto the films in such a way that exposed margins are left at the longitudinal sides of the films.

Such capacitors are known in the art. The prior art capacitors generally have capacitance values which decrease with increasing operational duration. This is due to the fact that the metallization is destroyed in the region adjacent to the exposed margins, due to the increased marginal field strength. The marginal field strength $F_K$ is thereby defined as follows:

$$F_K \sim F_H \sqrt{d_1/d_2},$$

whereby $d_1$ is the thickness of the dielectric, and $d_2$ the thickness of the metal coating at the margin; $F_H$ is the field strength of the homogeneous field in the inner portion of the capacitor. The marginal field strength is 10 to 100 times higher than the homogeneous field strength in the inner portions of the capacitor.

SUMMARY OF THE INVENTION

It is an object of the invention to provide a capacitor whereby the stated capacity decomposition does not occur, as well as a method for production of such a capacitor.

This object is achieved, in accordance with this invention, in that the polypropylene films are swelled in the region of the margin.

In accordance with a further development, a metallization has tears in the regions adjacent to the exposed margins.

The method in accordance with this invention is characterized in that the exposed margins are produced by use of an oil covering, and that the capacitor is subjected to a tempering for accomplishing a swelling after production.

BRIEF DESCRIPTION OF THE DRAWINGS

FIG. 3 illustrates a graph showing continuous testing of the capacitor in accordance with the invention as compared with prior art capacitors.

DESCRIPTION OF THE PREFERRED EMBODIMENTS

Figure 1:
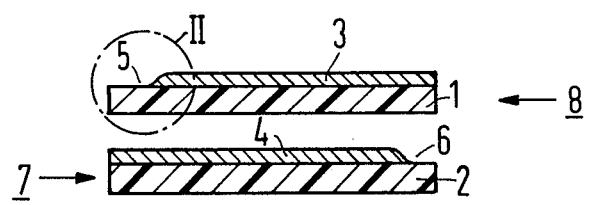
FIG. 1 illustrates the principle design of the capacitor before the tempering process.

FIG. 1 shows the design of a capacitor consisting of coiled layers of two polypropylene films 1 and 2. The polypropylene films 1, 2 comprise metallizations 3, 4 with exposed margins 5, 6. The polypropylene films 1, 2 are coiled in such a way that the exposed margins 5, 6 will be positioned at opposite sides of the capacitor. The contacting of the finished coiled capacitor is effected by way of metal spraying of the frontal sides 7, 8, the so-called Schoop's method.

The polypropylene films 1, 2 have a thickness of 10 μm, and the metallizations 3, 4 consist of aluminum and have a surface resistance of 3 Ohms. The free margins 5, 6 have a width of 2.5 mm. The finished capacitors with such parameters may typically be 3 μfd at 320V.

The metallizations 3, 4 producing the exposed margins 5, 6 are applied onto the films in the following manner. A polypropylene film whose width corresponds to a multiple of the films 1, 2 is provided with a metallization such that several metal-free zones are produced in the longitudinal direction of the film. In the center of these metal-free zones, the film is cut apart after the metallization process, and thus the polypropylene films with exposed margins are obtained for the production of the capacitors. Usually the exposed margins are produced by a tape covering in the prior art capacitors. In the case of the capacitors in accordance with this invention, however, the production of the exposed margins is accomplished by an oil covering. The difference between tape covering and oil covering consists in that the metallizations in the region of the exposed margin have a sharp edge in the case of tape covering, while the metallizations in the exposed marginal region begins in wedge-shaped fashion in the case of the oil covering, as can be seen from FIG. 1.

Figure 2:
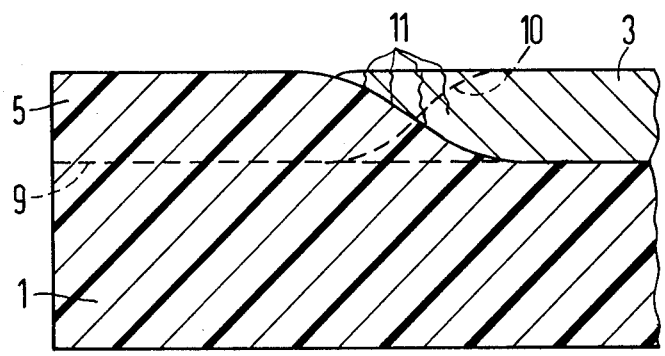
FIG. 2 illustrates an enlargement of section II in FIG. 1, with swelled polypropylene films in the region of the exposed margin.

FIG. 2 shows an enlargement of section II in FIG. 1 whereby the polypropylene film 1 is swollen in the exposed margin region 5, by way of a tempering process. The broken lines 9 and 10 show the state of the polypropylene film 1, as well as the metallization 3, in the adjacent region of the exposed margin 5, before the tempering process. The swelling of the polypropylene film 1 to the state as shown in FIG. 2 is effected by way of oil residue which remains due to the production of the exposed margin 5 with an oil covering upon the polypropylene film 1. The improved properites of the capacitor in accordance with the invention are explained in such a way that due to the swelling of the polypropylene film 1 in the exposed marginal region 5, the access of air to the metallization 3 in the finished coil is prevented, and thus an oxidation of the aluminum coatings due to the marginal field strength 6 is avoided. Simultaneously, oil residues remaining at the surface prevent the access of moisture to the metallization 3.

The improved properties, i.e. the decreased capacitance decomposition with time in accordance wih the invention is even more surprising since experiments have been made in the past in which the entire coil is impregnated with oil after production is finished. Such impregnated capacitors, however, had an even stronger capacitance decomposition with time than the nonimpregnated capacitors, which is due to the fact that the metallization is partially removed from the entire film due to the swelling process.

Furthermore, as illustrated in FIG. 2, the metallization 3 in the region adjacent the exposed margin 5 is lifted due to the swelling of the polypropylene film 1, and results in tears 11 in the wedge-shaped portion of the metallization 3. These tears cause a decrease of the high marginal field strengths and thus causes a further improvement of the capacitor in accordance with the invention.

Any known oils can be used for the oil covering which cause a swelling of the polypropylene film 1. Mineral oil as well as halogenated hydrocarbon materials are mentioned here as an example.

It is surprising that the capacitor produced in accordance with the method of this invention wherein exposed margins have been produced by way of an oil covering, has such excellent properties. In accordance with the formula which was stated earlier, the marginal field strengths in the case of the capacitor in accordance with the invention are higher than in the case of prior art capacitors, since the thickness $d_2$ of the metal coating at the margin is essentially smaller, due to the wedge-shaped increase, than in the case of the metallizations produced with tape coverings.

It must furthermore be stressed that due to the production of the exposed margins with an oil covering, a defined oil application is obtained at the exposed margin, and thus the polypropylene films are only swelled in the regions discussed above. A swelling of the entire polypropylene film would cause more of a capacity decrease, as stated above. Since some oil is still present upon the film in the region adjacent to the exposed margin (this is the reason for the wedge-shaped increase of the metallization 3) a slight swelling occurs at these positions, and thus the desired tear formation of the metallization 3 in the adjacent region of the exposed margin 5.

The tempering of the finished capacitor for the completion of the swelling process is advantageously effected for one day at 85° C.

In FIG. 3 the results of continuous experiments are illustrated using capacitors in accordance with the invention, as well as capacitors without swelled exposed margins for comparison. The capacitors were applied to an AC voltage of 560V in a surrounding temperature of 70° C. The capacity change $\Delta C/C$ as a percent is shown in FIG. 3 in dependence upon the experiment duration $t$, in hours. The curve 12 resulted with the capacitors in accordance with the invention. As it can easily be seen from the curve, the prior art capacitors (curve 13) show a clear capacity decrease with a continuous experiment duration, while the capacitors in accordance with this invention do not have this capacity decrease.

The invention is not limited to the sample embodiment shown in the figures, but can also be used with capacitors whose polypropylene films have a metallization with an exposed margin on both sides, whereby the adjacent coatings are at equal potential. Furthermore, the invention can also be used for such capacitors whose metallizations are produced with a tape covering. The required oil application in the region of the exposed margins is then effected in a separate operational process.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A self-healing AC electrical coiled capacitor comprising coiled layers of polypropylene films provided with metallizations applied onto the films such that exposed margins result along longitudinal edges of the films, the exposed margins being impregnated by a liquid, and the polypropylene films being swelled only in the region of the impregnated exposed margins, the swelled exposed margins preventing access of air to the metallizations in the finished coiled capacitor.

2. A self-healing electrical capacitor in accordance with claim 1, characterized in that the metallizations in the region adjacent to the exposed margins have tears.

3. A self-healing electrical capacitor comprising:
    (a) a plurality of polypropylene films each having a metallization layer on one surface thereof;
    (b) an exposed region adjacent the metallization layer along an edge of each of said films, substantially only said exposed region being swollen by liquid residues remaining from an impregnating liquid deposited only in said exposed region;
    (c) adjacent films positioned such that the exposed region edge on one film is opposite to the exposed region edge of the other film, the swollen exposed regions preventing the access of air to the metallization layers of the finished capacitor; and
    (d) a contacting means adjacent both opposite edges for contacting the metallization on the films.

4. A method for the production of a self-healing AC electrical capacitor, comprising the steps of:
    (a) producing polypropylene films with margins along a longitudinal edge of the films having an oil covering thereon to promote swelling, a metallization being applied on the films inwardly of the margins resulting in exposed margins;
    (b) assembling the capacitor with said films; and
    (c) subjecting the assembled capacitor to a tempering process to complete a swelling of the films substantially only at said exposed margins so as to prevent access of air to the metallization in the assembled capacitor, substantially all of the film covered by metallization remaining unswelled.

5. A method in accordance with claim 4, characterized in that the capacitors are tempered for one day at 85° C.

6. A method for the production of a self-healing electrical capacitor, comprising the steps of:
    (a) providing a polypropylene film;
    (b) applying an oil covering along a longitudinal portion of the film;
    (c) applying a metallization to the film;
    (d) cutting the film along the longitudinal portion and removing some of the oil covering to create cut films with an exposed region of the cut films along a longitudinal edge;
    (e) assembling the capacitor with said cut films by rolling technique; and
    (f) subjecting the assembled capacitor to a tempering process to promote swelling of the films at said exposed regions.

* * * * *